(12) United States Patent
Bukovac (10) Patent No.: US 9,184,574 B2
(45) Date of Patent: Nov. 10, 2015

(54) CABLE PULLING SYSTEM

(76) Inventor: John D. Bukovac, Oborlin, OH (US)

(*) Notice: Subject to any disclaimer, the term of this patent is extended or adjusted under 35 U.S.C. 154(b) by 1050 days.

(21) Appl. No.: 13/282,206

(22) Filed: Oct. 26, 2011

(65) Prior Publication Data

US 2013/0105748 A1    May 2, 2013

(51) Int. Cl.
*H02G 1/06* (2006.01)
*H02G 3/04* (2006.01)

(52) U.S. Cl.
CPC ............... *H02G 1/06* (2013.01); *H02G 3/0443* (2013.01)

(58) Field of Classification Search
CPC ............. H02G 7/10; H02G 7/06; H02G 7/00; D07B 7/14; D07B 1/00
See application file for complete search history.

(56) References Cited

U.S. PATENT DOCUMENTS

| | | | |
|---|---|---|---|
| RE25,549 E * | 4/1964 | Hendrix ................. | 254/134.3 R |
| 4,101,114 A | 7/1978 | Martin et al. | |
| 4,760,991 A | 8/1988 | Asai | |
| 5,779,229 A * | 7/1998 | Lirette ................. | 254/134.3 FT |
| 2011/0042630 A1 | 2/2011 | Degasne et al. | |
| 2011/0127476 A1 * | 6/2011 | Ballard .................. | 254/134.3 R |
| 2012/0061633 A1 * | 3/2012 | Holley ................... | 254/134.3 R |
| 2013/0105748 A1 * | 5/2013 | Bukovac ................. | 254/134.3 R |
| 2014/0131645 A1 * | 5/2014 | Jordan et al. ........... | 254/134.3 R |
| 2014/0175349 A1 * | 6/2014 | Swindle ................ | 254/134.3 R |

FOREIGN PATENT DOCUMENTS

| | | |
|---|---|---|
| EP | 0 653 892 A1 | 5/1995 |
| JP | 4-295216 | 10/1992 |

* cited by examiner

*Primary Examiner* — Lee D Wilson
(74) *Attorney, Agent, or Firm* — Richard C. Litman (57) ABSTRACT

The cable pulling system includes a jet loop for pulling cable through a cable tray in a structure, such as a building. The jet loop is physically coupled to a bracket, which is clamped to the cable tray. The bracket uses clamp wing nuts matched to threaded clamp bolts to compressively hold upward-extending portions of the U-shaped members of the cable tray between clamp plates and downward-extending portions of either end of the bracket. The clamp plates and the downward-extending portions of either end of the bracket have matching pairs of indentations whose center axes and edges align with one another and with the uppermost two wires on either side of the cable tray. The jet loop can be moved in either of two opposite directions and is removably coupled to a cable or bundle of cables to pull the cables through the cable tray.

15 Claims, 13 Drawing Sheets

CABLE PULLING SYSTEM

BACKGROUND OF THE INVENTION

1. Field of the Invention

The present invention relates to cable installation, and particularly to a cable pulling system for installing communications cable.

2. Description of the Related Art

It has been widely observed that the world is becoming increasingly more connected electronically with the passage of time. As such, buildings designed for business and/or residential use often provide for some combination of communication services such as Internet service, television, telecommunications, etc., for users of those buildings. Some or all of these communications services often rely on installing communication cables in those buildings, such as coaxial cable, twisted pair cable, and fiber optical cable, to ensure that the signals they are designed to carry reach the desired destinations in those buildings. While wireless communications have also been increasing, finite wireless bandwidth and myriad other issues, including security concerns, suggest wired communications solutions will continue to be widely employed in many buildings.

On aspect of relying on wired communications solutions is the need to install communication cables throughout new and existing buildings to provide the desired connectivity. Currently cable trays of various sizes are used to hold cables in many buildings. Cables are often pulled through these cable trays by hand, sometimes in large groups and often with one group of cables in physical contact with another group of cables as they are being pulled through the cable tray. Strings or ropes are often employed in the cable trays to allow the cables to be pulled through them.

Current methods of installing cable in buildings give rise to many problems. The desire for additional connectivity often means large numbers of cables must be pulled through cable trays and significant friction problems can develop within and between these cables. This friction not only makes the installers' task difficult, it can lead to damaged or broken cables. In some cases lubricant is used to allow cables to slide past one another, but lubricant can be costly and messy and does not solve all friction issues.

Because the current cable installation is difficult and can damage the cables being installed, it would be desirable to mitigate or eliminate these shortcomings. Thus, a cable pulling system solving the aforementioned problems is desired.

SUMMARY OF THE INVENTION

The cable pulling system provides a jet loop for pulling cable through a cable tray in a structure. The jet loop is physically coupled to a bracket through an aperture in at least one eyelet bolt. The eyelet bolt is physically coupled to the bracket through a bracket aperture and an eyelet wing nut. The bracket uses clamp wing nuts matched to threaded clamp bolts to compressively hold upward-extending portions of the U-shaped members of the cable tray between clamp plates and downward-extending portions of either end of the bracket. The clamp plates and the downward-extending portions of either end of the bracket have matching pairs of indentations whose center axes and edges align both with one another and with the uppermost two wires on either side of the cable tray to securely clamp the bracket to the cable tray. The bracket can have eyelet bolts or roller bolts attached through five bracket apertures. Roller bolts attach rollers to the bracket to allow cable being pulled through curved portions of the cable tray to avoid contact with stationary objects, thereby greatly reducing friction, the associated difficulties in pulling cable, and wear and tear on the cables. A separate elevation roller is attached to the cable tray through a bracket to adjust the elevation of cable being pulled through the cable tray, similar to the rollers used in curved portions of the cable tray.

The cable pulling system is used by attaching one or more cables in a bundle of cables to an attachment line coupled to the jet loop, pulling the jet loop and attached cables through the cable tray, disconnecting the cables from the attachment line for installation, reversing the direction of the jet loop to locate the attachment line in a position where another cable or group of cables can be attached to the jet loop, and then the process can begin again, as desired.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The cable pulling system eliminates the string or rope used in current arrangements for pulling cable, and uses a jet loop to pull cable instead.

Figure 1:
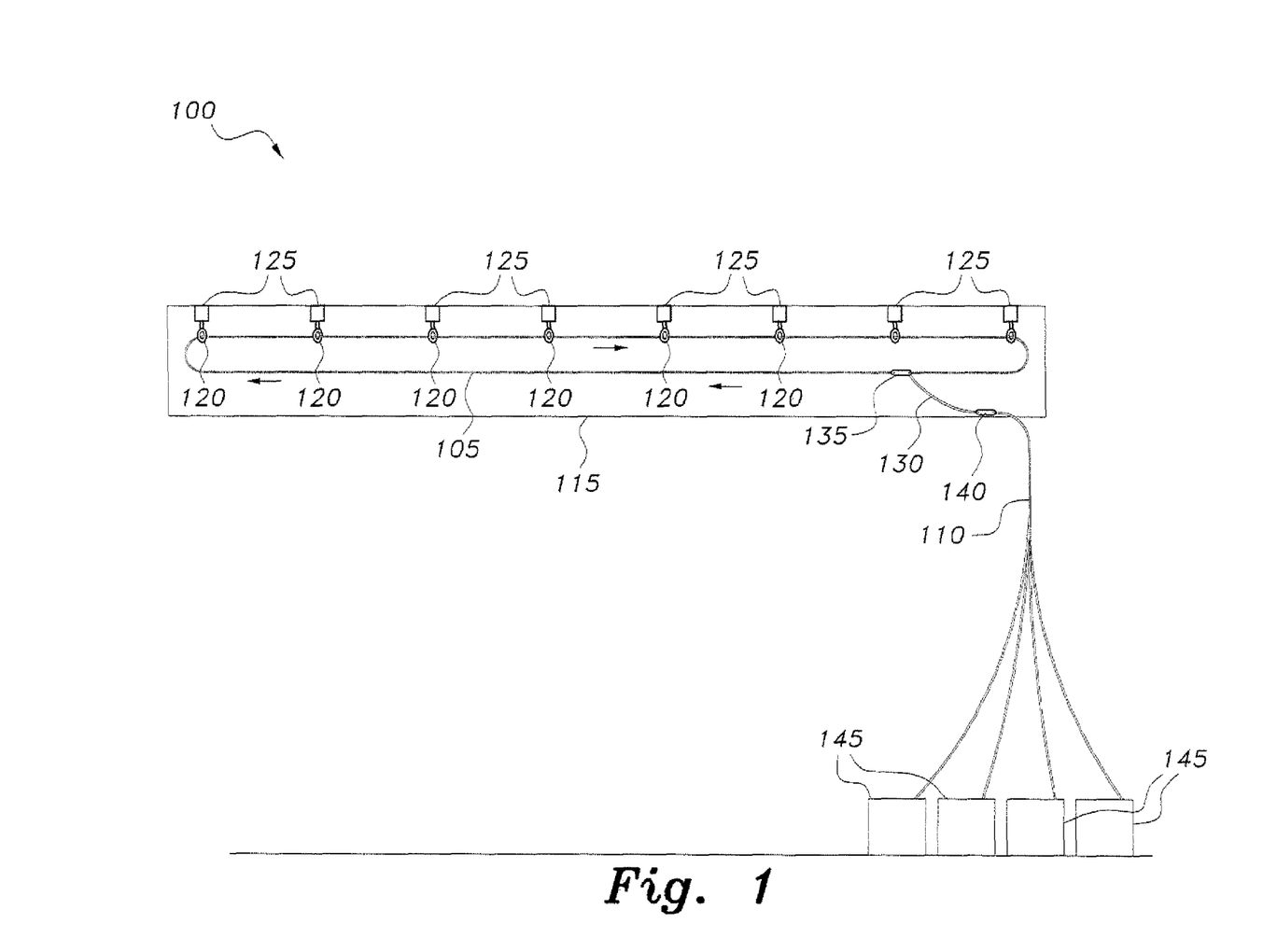
FIG. 1 is a schematic environmental side view of a cable pulling system according to the present invention, having cables coupled to a jet loop in a cable tray.

FIG. 1 shows a schematic side view of the cable pulling system 100, which includes a movable jet loop 105 for pulling cables 110 in a cable tray 115. The jet loop 105 passes through at least one eyelet bolt 120 (or eye bolt). Eight eyelet bolts 120 are shown for illustration purposes in FIG. 1. Six of the eight eyelet bolts 120 are labeled for clarity purposes. The jet loop 105 is a closed loop of elongated material and can be constructed of any sufficiently strong and pliable material or combination of materials to form a continuous loop. In a preferred embodiment, the jet loop 105 may be made from a lightweight nylon rope, such as paracord, the name being originally derived from parachute cord. Alternatively, the jet loop 105 may be made from other strong material or combination of materials, such as nylon, other synthetic polymers, steel cable, natural fibers, etc. The jet loop 105 also may have a durable, low-friction outer coating, such as certain known polymeric coatings, to make it more easily and reliably pulled through the eyelet bolts 120. The jet loop 105 can be pulled manually, but can also be motorized, if desired. The jet loop 105 can primarily move in either of two opposite directions longitudinally inside the cable tray 115 and eliminates the need for string or rope currently used to pull cables 110 through cable trays 115. The jet loop 105 can also pull cables 110 through curved cable trays 115 and through cable tray intersections as described in detail herein.

The eyelet bolts 120 through which the jet loop 105 passes are themselves coupled to the cable tray 110 through brackets 125. The brackets 125 are described in more detail herein and provide a relatively confining attachment for the jet loop 105 so that the jet loop 105 primarily moves in either a clockwise or a counter-clockwise direction, as shown in FIG. 1.

The cables 110 themselves can be attached singly or in bundles to the jet loop 105 through an attachment line 130. One end of the attachment line 130 is connected to the jet loop 105 through an attachment line connector 135, and an opposite end of the attachment line 130 is connected to the cables 110 through a cable connector 140. The attachment line connector 135 may be oblong and have two apertures at opposite ends for connecting to the jet loop 105 and attachment line 130, respectively. In some preferred embodiments, the attachment line connector 135 and the cable connector 140 can be different instances of the same connector design that differs only by how they are used.

Cables 110, which are attached at one end to the attachment cable 130 through the cable connector 140, are shown as being stored in cable boxes 145, as is known in the art, but other methods of storing cable, including spools, can also be used.

Figure 2:
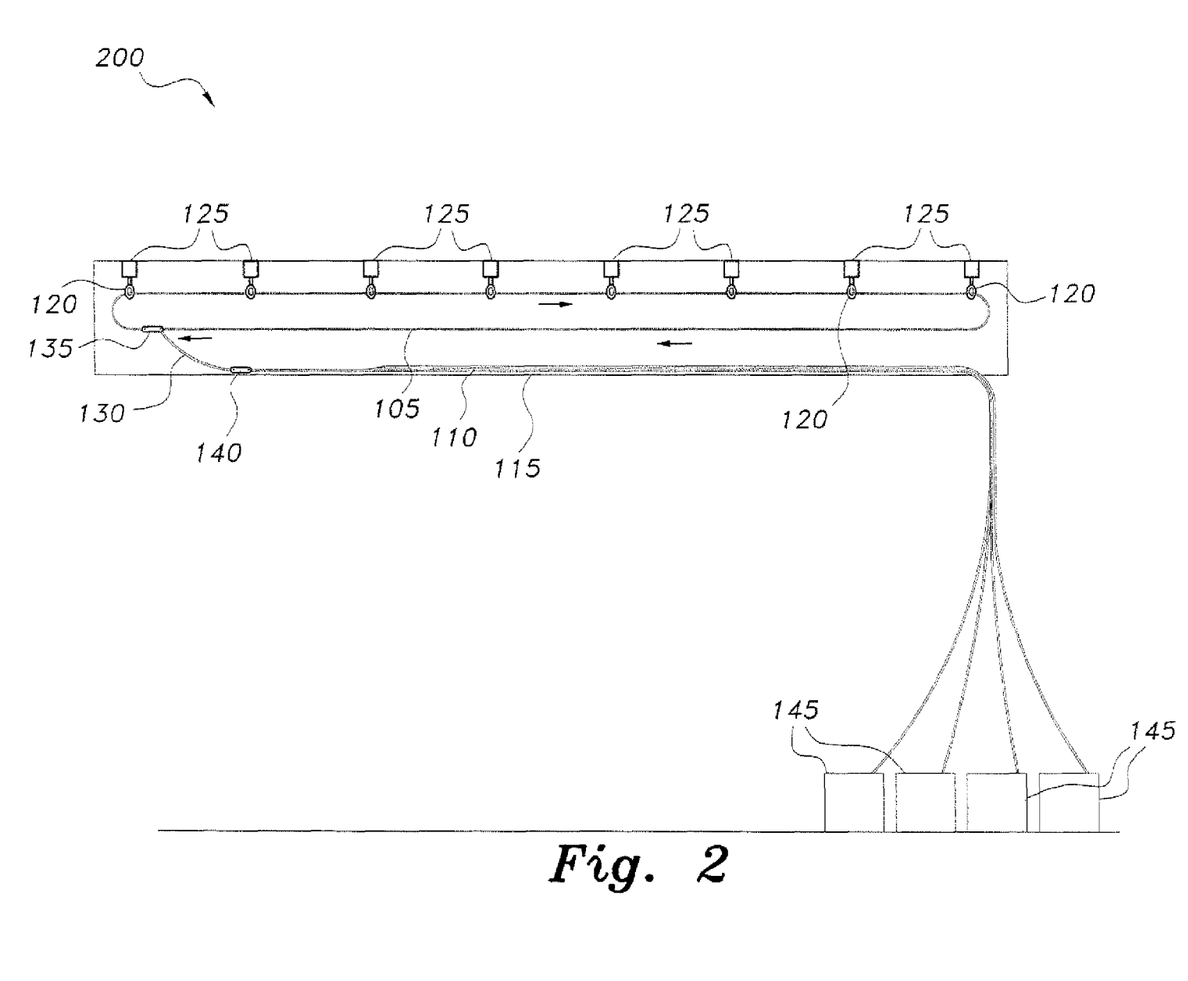
FIG. 2 is a schematic environmental side view of a cable pulling system according to the present invention, showing the cables being pulled by the jet loop through the cable tray.
Figure 3:
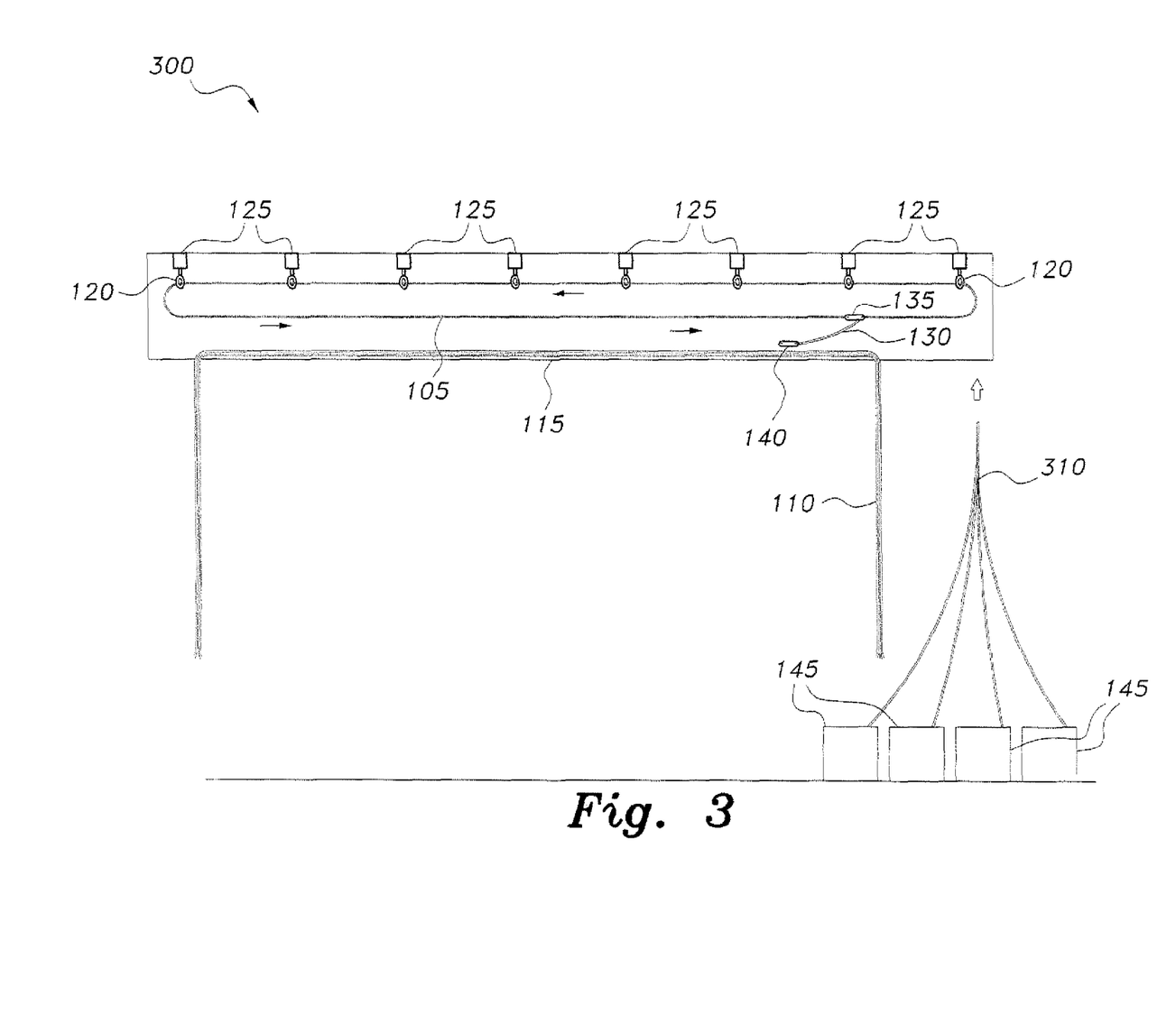
FIG. 3 is a schematic environmental side view of a cable pulling system according to the present invention, showing cables pulled by the jet loop through the cable tray with cables decoupled and the jet returned to a starting position.

FIGS. 1-3 show a sequence of cable being pulled or drawn through the cable tray 115. FIG. 1 shows the cable pulling system 100 with the cables 110 coupled to the jet loop 105 in the cable tray 115 in a position ready to be pulled through the cable tray. FIG. 2 shows a schematic side view in which the cables 110 have been pulled into the cable tray 115 by the jet loop 105. As compared to FIG. 1, the cables 110 in FIG. 2 have moved from right to left and the jet loop 105 has rotated clockwise. The cables 110 were pulled by the jet loop 105, which was itself pulled manually by a worker in order to reduce the complexity and expense associated with the cable pulling system. In some alternative embodiments, the jet loop is motorized and may be controlled by the worker.

FIG. 3 shows a schematic side view that differs from FIG. 2 in that the cables 110 have been disconnected from the jet loop 105 and further pulled into place for final installation by a worker, so that both ends of the cable 110 are shown extending downward beyond the cable tray 115. The jet loop 105 is no longer coupled to the cables 110 that were previously pulled through the cable tray, and the jet loop 105 has now been moved in the opposite direction (shown as being counter-clockwise) to prepare for pulling another bundle of cables 310 through the cable tray 115. The attachment line 130, attachment line connector 135, and cable connector 140 are shown trailing the jet loop 105 in a left-oriented direction, unlike in FIG. 1 where they are shown in a right-oriented direction, because the jet loop 105 has been pulled counter-clockwise to position the attachment line 130 to pull another bundle of cables 310 through the cable tray 115. Thus, taken together, FIGS. 1-3 illustrate how the cable pulling system pulls cable 110 through the cable tray 115 for installation in a structure and is reset to pull another bundle of cables 310 through the cable tray 115.

Figure 4:
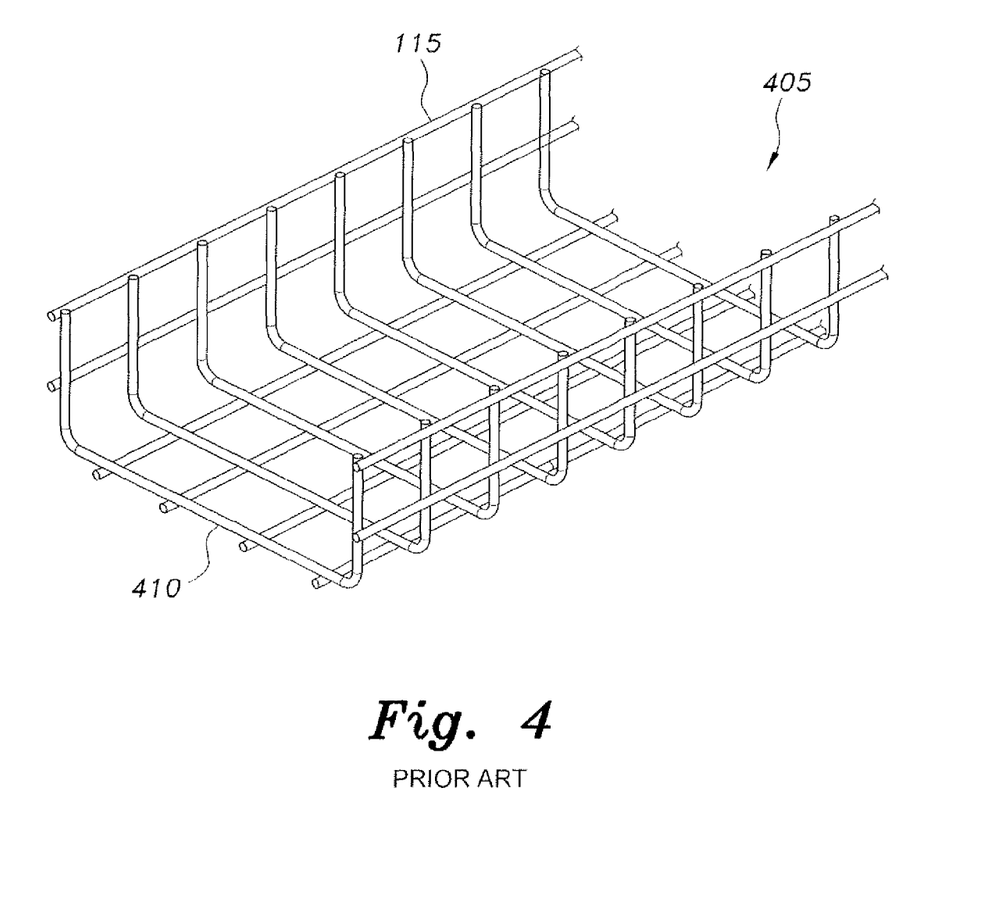
FIG. 4 is a perspective view of an exemplary prior art cable tray for use with the cable pulling system according to the present invention.

FIG. 4 shows a prior art cable tray 115 that is used with the cable pulling system 100. As shown in FIG. 4, the cable tray 115 is formed from a first set of parallel wires 405 and a second set of parallel wires 410. The first set of parallel wires 405 is connected perpendicularly to the second set of parallel wires 410, as is known in the art. The second set of parallel wires 410 is bent upwards at its ends, as shown in FIG. 4, to form U-shaped members or portions of the cable tray 115. In this fashion the cable tray 115 is structured into a U-shaped tray of some useful length. While cable trays 115 can be of any arbitrary size, they are often 2-6 inches deep and 12-24 inches wide. They are assembled to be as long as required. For example, the cable tray 115 shown in FIGS. 1-3 may have a final length of 200 feet long.

Figure 5:
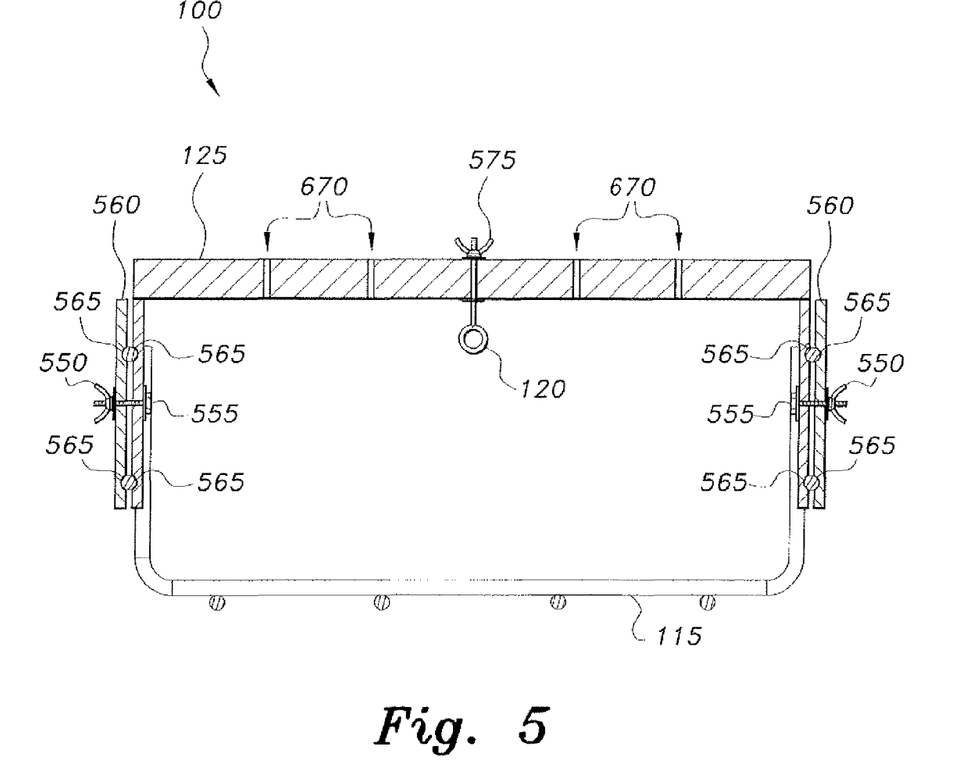
FIG. 5 is a schematic side view in section showing a bracket in the cable pulling system according to the present invention.

FIG. 5 shows a schematic side view of a bracket 125 used to support an eyelet bolt 120. The bracket 125 includes two substantially identical, but opposite facing, clamps designed to attach to the two upward-extending portions of the U-shaped members of the cable tray 115. More specifically, the bracket 125 uses clamp wing nuts 550 matched to threaded clamp bolts 555 in order to compressively hold the upward-extending portions of the U-shaped members of the cable tray 115 between clamp plates 560 and the downward-extending portions of either end of the bracket 125. Preferably, the clamp plates 560 are matched to the downward-extending portions of either end of the bracket 125 in width, thickness and in that both have a pair of indentations 565 whose center axes and edges align with one another. Spacing between the indentations in each pair of indentions 565 is substantially the same as the spacing between the uppermost two wires on each end of the U-shaped members of the cable tray 115 to allow the bracket 125 to be clamped onto the cable tray 115. The uppermost two wires on each end of the U-shaped portions of the cable tray 115 are compressively held within the pair of indentations 565 between the clamp plates 560 and the downward-extending portions of either end of the bracket 125 so each bracket 125 provides a secure and stable connection to the cable tray 115 and the bracket 125 will not move substantially with respect to the cable tray 115 when the cable pulling system of the present invention is in use. The bracket can be extended and is designed to use at least one eyelet bolt 120 coupled to the bracket 125 with an eyelet wing nut 575. The jet loop 105 passes through at least one eyelet bolt 120 as described herein.

Figure 6:
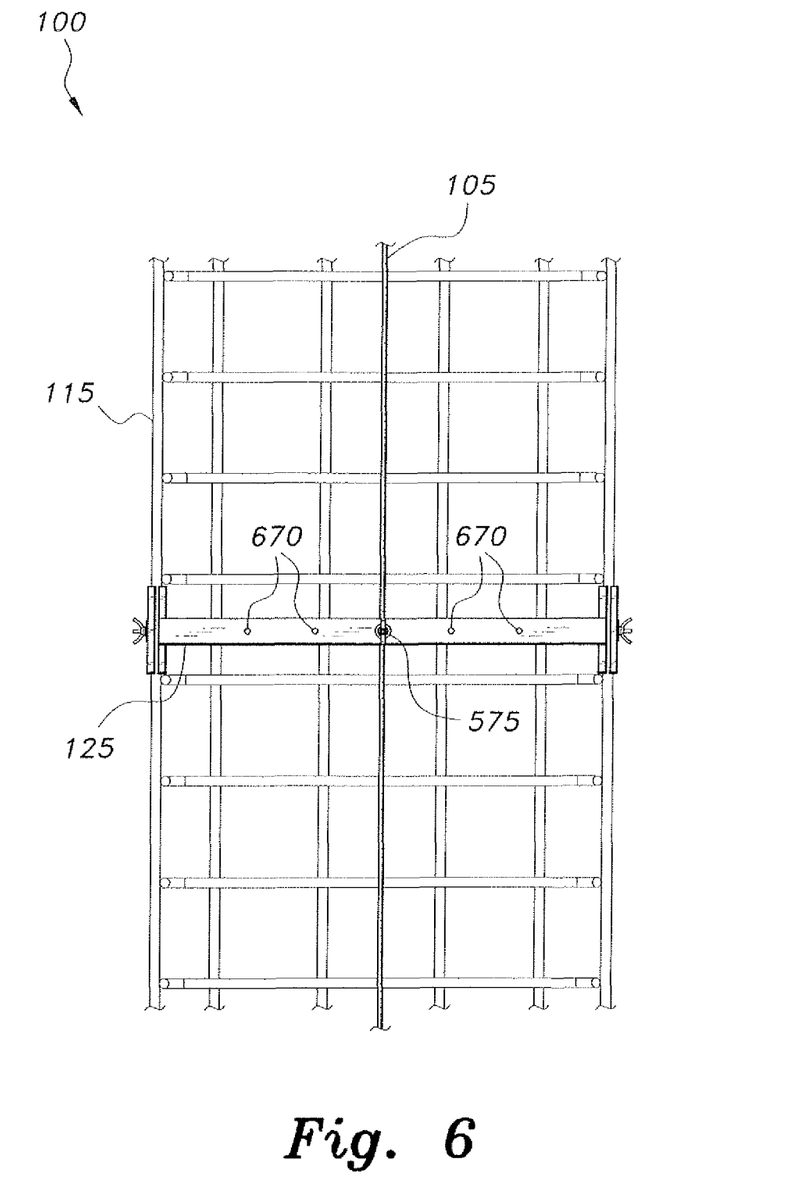
FIG. 6 is a schematic top view of the bracket of FIG. 5, shown connected to the cable tray in the cable pulling system according to the present invention.

FIG. 6 shows a schematic top view of the bracket 125 connected to the cable tray 115. The bracket 125 extends across the width of the tray 115 and has a body that contains five (5) bracket apertures 670 formed therein and arranged in a series, but is not limited to any particular number of bracket apertures 670. For illustration purposes, a middlemost bracket aperture 670 is shown with the eyelet wing nut 575 securing the eyelet bolt 120 for holding the jet loop 105. The eyelet wing nut 575 may be of the same type and dimensions as the clamp wing nuts 550, but this is not required.

Figure 7:
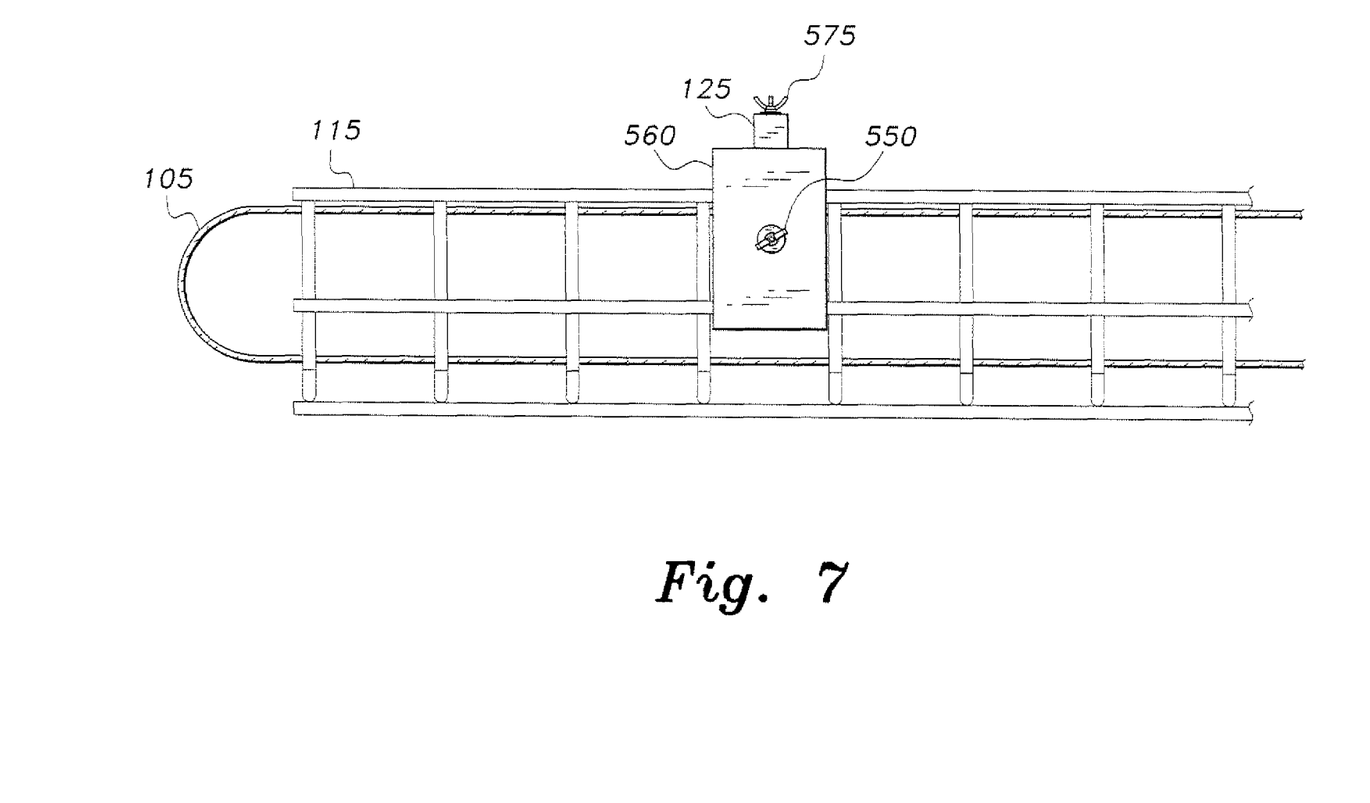
FIG. 7 is a schematic side view of the bracket of FIG. 5, shown connected to the cable tray in the cable pulling system according to the present invention.

FIG. 7 shows a schematic side view of the bracket 125 clamped to the cable tray 115 in the cable pulling system 100 according to the present invention. The clamp wing nut 550 can be seen in front of the clamp plate 560 in this view. The clamp plate 560 is coupled to the two uppermost wires in the cable tray 115 in order to compressively hold the upward-extending portions of the U-shaped members of the cable tray 115 between clamp plates 560 and the downward-extending portions of either end of the bracket 125. As described above, the bracket 125 is shown with the eyelet wing nut 575 securing the eyelet bolt 120 for holding the jet loop 105.

Figure 8:
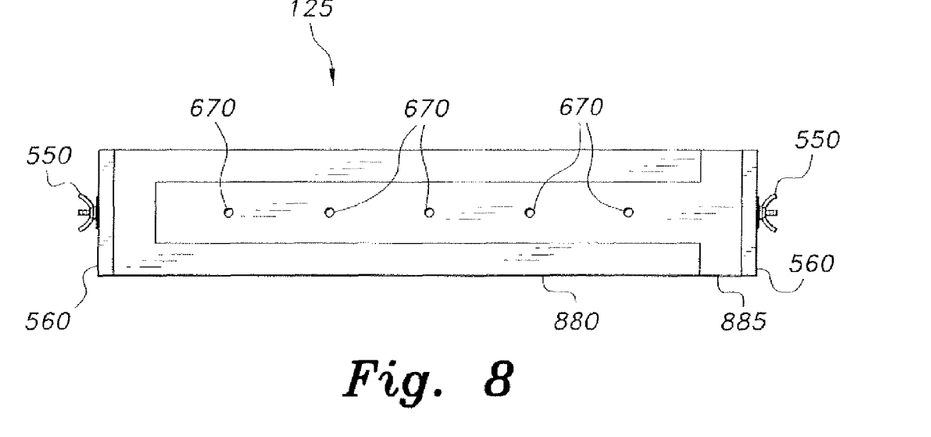
FIG. 8 is a schematic top view of the bracket of FIG. 5, shown in a closed position.

FIG. 8 shows a schematic top view of the bracket 125 in a closed position. The bracket 125 contains five (5) bracket apertures 670 arranged in a series, as recited above, but is shown without any eyelet wing nuts 675 or eyelet bolts 120 for illustration purposes. Two clamp wing nuts 550 are shown with clamp plates 560 at either end of the bracket 125. The bracket 125 has a body that includes a female bracket portion 880 and a male bracket portion 885 telescopically mated together in a closed position.

Figure 9:
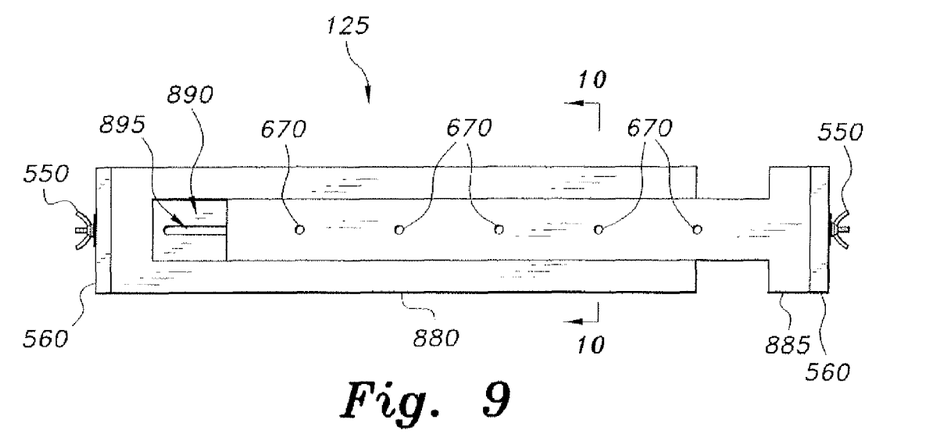
FIG. 9 is a schematic top view of the bracket of FIG. 5, shown in a partially open or extended position.

In contrast to FIG. 8, FIG. 9 shows a schematic top view of the bracket 125 in a partially open or extended position in which the female bracket portion 880 and the male bracket portion 885 have been partially separated by extending the male portion 885 longitudinally to the right, as shown. Extension of the male bracket portion 885 to the right with respect to the female bracket portion 880 has exposed an inner surface 890 and slot 895 in the female bracket portion 880. The purpose of this extension is to allow the bracket 125 to adjust to cable trays 115 of different widths by correspondingly extending the male bracket portion 885 away from the female bracket portion 880 to align each pair of indentions 565 (not shown here) to the U-shaped members or portions of the cable tray 115. In this fashion the bracket 125 can be securely clamped to cable trays 115 of different widths. Because the bracket 125 is adjustable, it is more cost effective and usable in a variety of different structures having cable trays 115 of differing widths.

Figure 10:
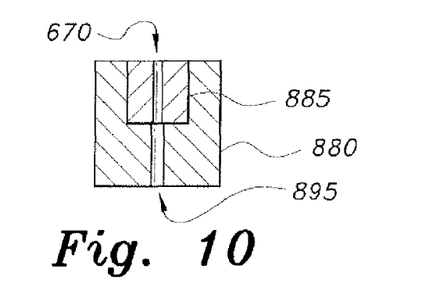
FIG. 10 is a section view along lines 10-10 of FIG. 9.

FIG. 10 shows a section view of the bracket 125. The male bracket portion 885 can be seen as being enclosed by the female bracket portion 880 on most of three of four sides at this extension of the bracket 125. The bracket aperture 670 is shown aligned with the female aperture 895 of the female bracket portion 880 so that the eyelet bolt 120 and eyelet wing nut 575 can compressively hold the male bracket portion 885 and female bracket portion 880 together to form the bracket 120.

Figure 11:
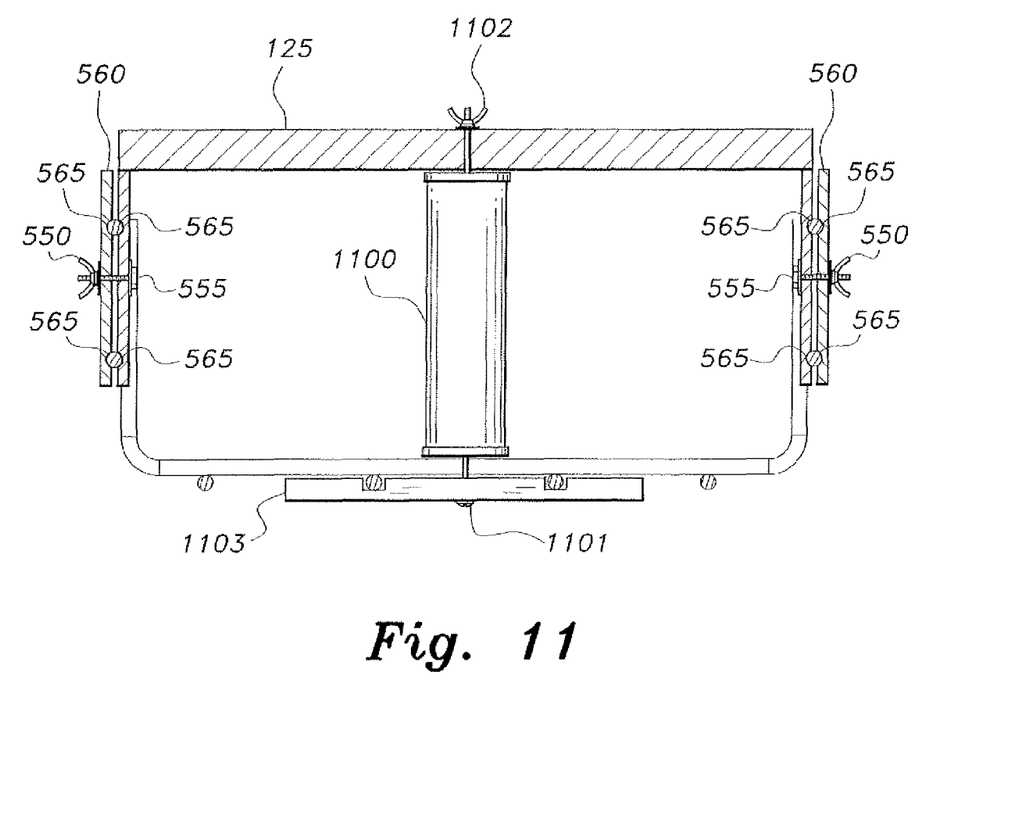
FIG. 11 is a schematic side view of a roller coupled to the bracket of FIG. 5.

FIG. 11 shows a schematic side view of a roller 1100 coupled to the bracket 125. The roller 1100 is rotatably coupled to the bracket 125 through a first roller bearing. The first roller bearing is coupled to the bracket 125 with a roller bolt 1101 and roller bolt wing nut 1102. The roller 1100 is also rotatably coupled to the cable tray 115 through a second roller bearing. The second roller bearing is coupled to the cable tray 115 through the roller bolt 1101 and roller bolt wing nut 1102 securing a roller plate 1103, as shown in FIG. 11. As shown here, the roller plate 1103 is designed to fit below and securely connect with the cable tray 115, as described in FIG. 12. Thus, the roller 1100 is rotatably coupled to both the bracket 120 and the cable tray 115 through first and second roller bearings. The primary purpose of the roller 1100 is to enable cables 110, 310 to be much more easily pulled through non-linear (bent or curved) portions of the cable tray 115 without a large increase in friction. By minimizing the increase in friction in cable tray 115 bends, cables 110, 310 being pulled through bent portions of the cable tray 115 can be much more easily pulled by hand or motor, and are subject to much less tension and frictional wear and tear, thus leading to both easier and more reliable installations of cable.

Figure 12:
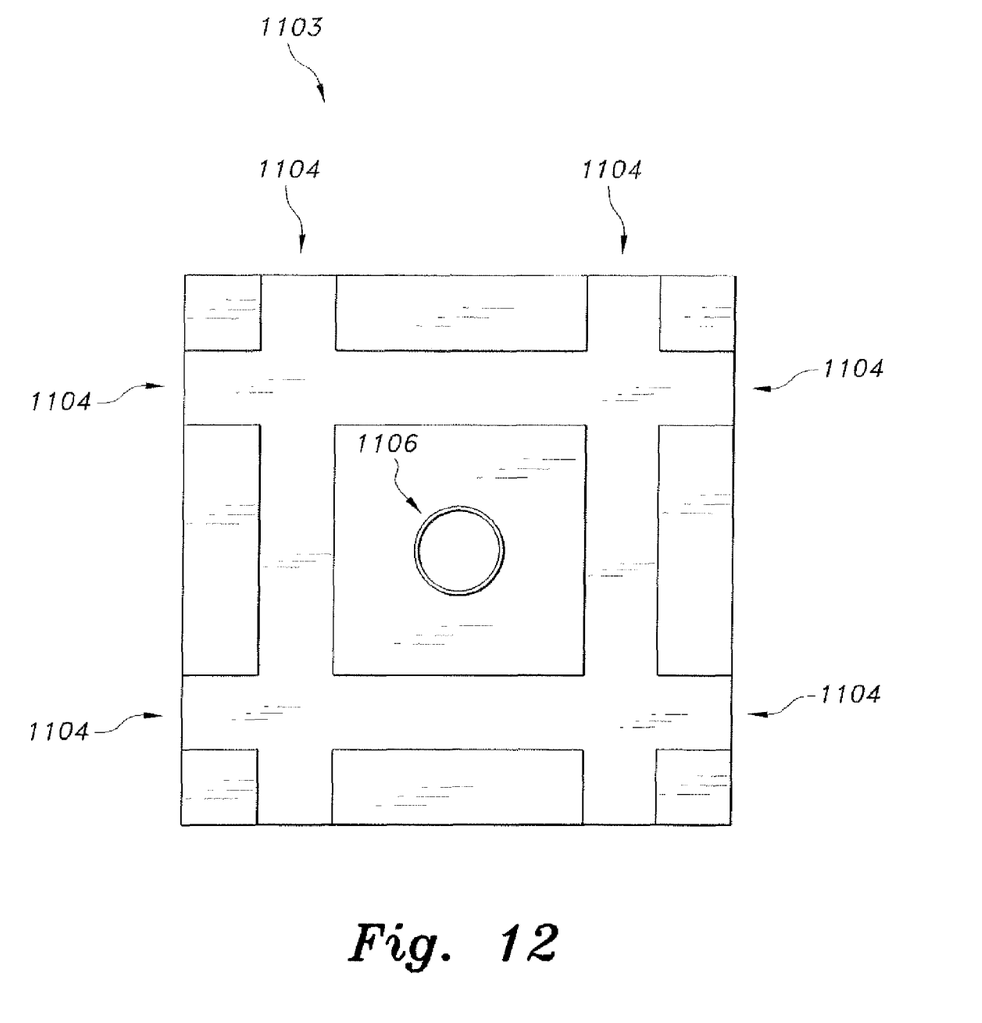
FIG. 12 is a diagrammatic top view of a roller plate of the cable pulling system according to the present invention.

FIG. 12 is a diagrammatic top view of the roller plate 1103. The roller plate 1103 contains grooved portions 1104 that are lower in elevation than other portions of the roller plate 1103 to accommodate wires making up the cable tray 115. When the roller 1100 is rotatably coupled to both the bracket 125 and the cable tray 115, the roller plate 1103 is in direct contract with the cable tray 115 in that the wires making up the cable tray 115 run through the grooved portions 1104 in the roller plate 1103. This is done to provide a better connection between the roller plate 1103 and the cable tray 115 and prevent any residual rotational torque from rotating the roller plate 1103. The roller plate 1103 also has a roller plate aperture 1106 through which the roller bolt 1101 passes.

Figure 13:
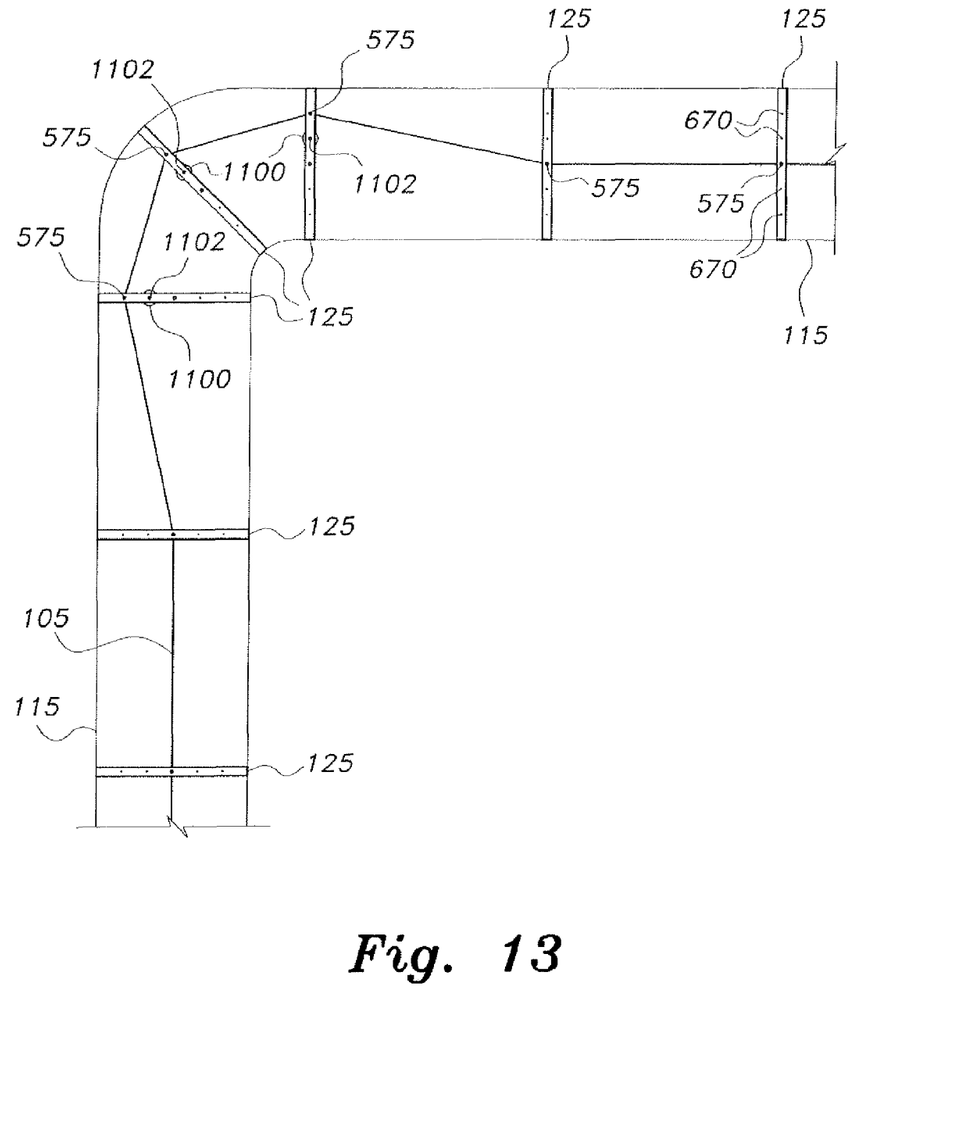
FIG. 13 is a schematic top view of an exemplary cable tray having both straight and curved portions of the cable pulling system according to the present invention attached thereto.

FIG. 13 is a schematic partial top view of an exemplary cable tray 115 having both straight and curved portions. In this example, the cable tray 115 bends approximately 90° in the middle, and seven (7) brackets 125 are used to carry the jet loop 105, although the cable pulling system is not limited to any particular number of brackets 125 greater than one. As described herein, each bracket 125 contains five (5) bracket apertures 670 arranged in a series. All seven brackets 125 are shown with one eyelet wing nut 575 coupled to one eyelet bolt 120 for holding the jet loop 105. In this fashion, the jet loop 105 can be pulled through the cable tray 105. In or near the portion of the curved portion of the cable tray 115, three brackets 125 also are shown to have one roller bolt wing nut 1102 for coupling one roller to each of the three brackets 125. The rollers enable cable 110 being pulled through the cable tray 115 to negotiate the curve in the cable tray 115 without rubbing against a non-moving surface. The rollers 1100 greatly reduce the friction associated with pulling cable 110 through the curve in the cable tray 115, thereby mitigating or overcoming a significant problem with the prior art.

Figure 14:
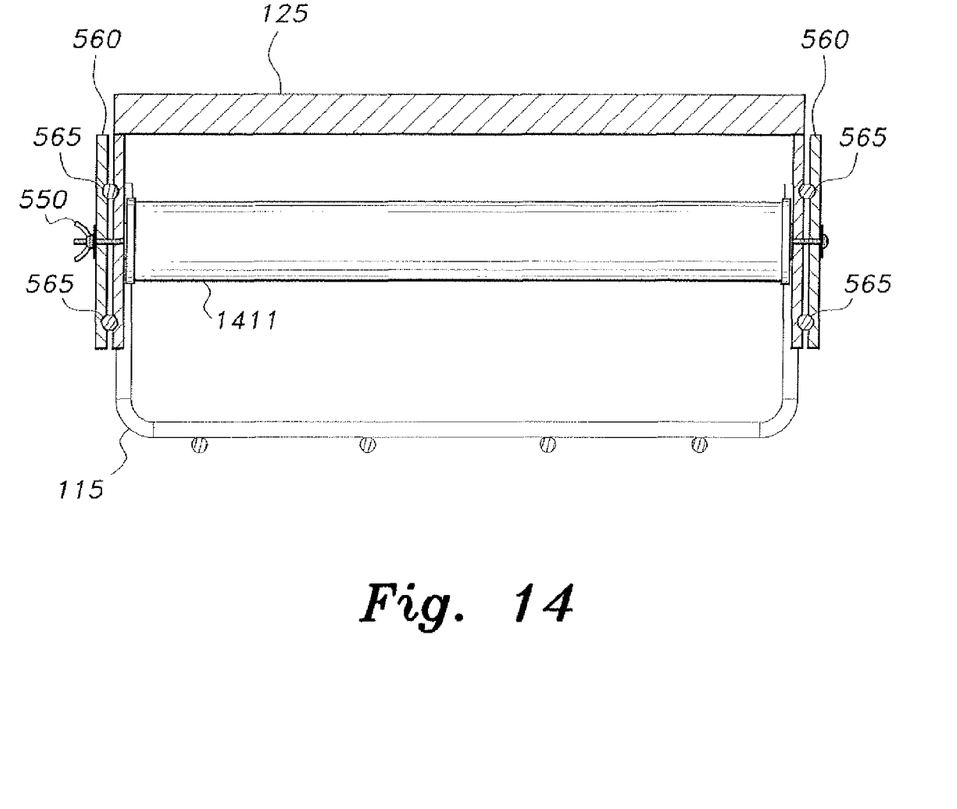
FIG. 14 is a schematic side view of an elevation roller and cable tray in the cable pulling system according to the present invention.

FIG. 14 shows a schematic side view of an elevation roller and cable tray. Similar to the roller 1100, the elevation roller 1411 is secured to the bracket 125. However, the elevation roller 1411 is oriented in a horizontal position, while the roller 1100 is oriented in a vertical position. The purpose of the elevation roller 1411 is to change the elevation of cable being pulled through a cable tray 115 because the cable tray 115 itself has a change in elevation. This often occurs when the elevation of cable tray 115 is not uniform due to the presence of pipes and other obstructions in the structure where cable 110 is being installed. Both ends of the elevation roller 1411 are coupled to the bracket 125. Each end of the elevation roller 1411 is coupled with a ball bearing to the downward-extending portions of either end of the bracket 125. The elevation roller 1411 has the same advantages for changes in elevation in the cable tray 115 as the roller 1100 has for curves in the cable tray 115.

Figure 15:
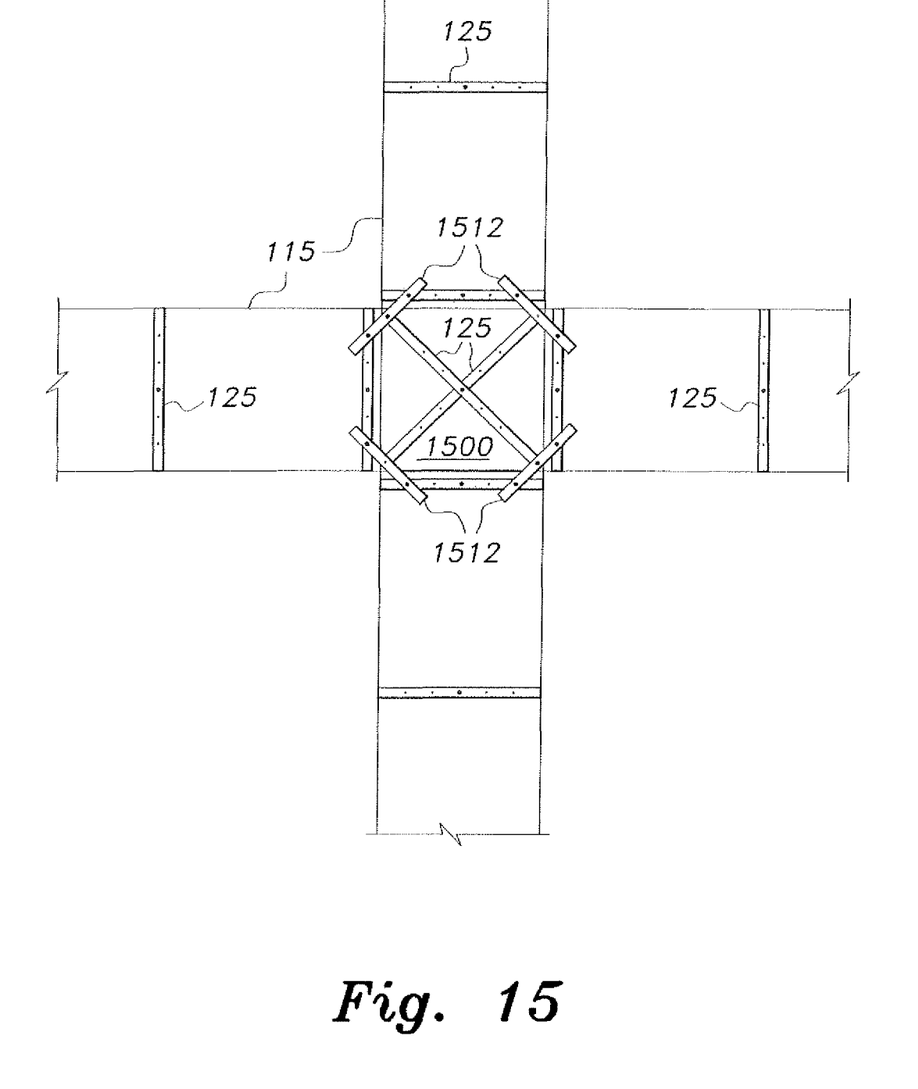
FIG. 15 is a schematic top view of the cable pulling system according to the present invention, showing multiple brackets at a cable tray intersection.

FIG. 15 is a schematic top view of brackets 125 at a cable tray intersection. In FIG. 15, two diagonal, intersecting cable trays 115 are shown. Each cable tray 115 contains five separate brackets 125. One bracket 125 from each cable tray 125 is located in the area of intersection 1500. Because the intersection 1500 in the cable trays 115 eliminates the usual connection to the U-shaped portions of the cable tray 115 for the brackets 125, each bracket 125 in the intersection 1500 has its own intersection support brackets 1512 at either end of the bracket 125. The intersection support brackets 1512 provide support and connect the brackets 125 to the cable trays 115 in the area of intersection, as shown, thus allowing more than one jet loop to move through the intersection 1500 of cable trays 115.

It is to be understood that the present invention is not limited to the embodiments described above, but encompasses any and all embodiments within the scope of the following claims.

I claim:

1. A cable pulling system for pulling cable through a cable tray, comprising:
    a plurality of elongate brackets, each of the brackets having downward extending portions at opposite ends adapted for physically coupling the bracket to the cable tray, wherein each of the brackets comprises a central portion having a length dimensioned and configured for extending across an open top of the cable tray;
    a jet loop supported by the plurality of brackets, the jet loop being rotatable and adapted for having the cable attached thereto, the cable being pulled through the tray by rotation of the jet loop;
    an eyelet bolt attached to each of the brackets, the jet loop passing through the eyes of the eyelet bolts, wherein the eyelet bolts are fastened to the central portion of each of the brackets so that the eyes of the eyelet bolts extend down into the tray, whereby the jet loop is suspended from the brackets;
    a plurality of clamp plates corresponding in number to the downward extending portions of the brackets, each of the downward extending portions having one of the clamp plates corresponding therewith, the clamp plates and the downward extending portions of the brackets having opposing faces having complementary indentations formed therein adapted for receiving wires forming sides of the cable tray therein;
    a plurality of fasteners clamping the clamp plates and the downward extending portion of said brackets together on opposite sides of the cable tray;
    a horizontal roller extending between the downward extending portions of one of said brackets, the roller having a hollow central shaft; and
    a bolt extending through the hollow shaft and through opposing pairs of said clamp plates and the downward extending portion of said brackets, the bolt being selectively fastened thereto, the horizontal roller easing transition of the cable through elevation changes in the cable tray.

2. The cable pulling system according to claim 1, wherein the central portion of said bracket has a plurality of spaced apart apertures defined therein adapted for receiving said eyebolts, whereby said jet loop may be selectively positioned across the width of the cable tray.

3. The cable pulling system according to claim 2, further comprising:
    a vertical roller having a hollow central shaft;
    a roller plate adapted for placement under the cable tray; and
    a bolt extending through the roller plate, the hollow shaft, and one of the apertures in the central portion of one of said brackets, the bolt being selectively fastened thereto, the vertical roller easing transition of the cable through curves in the cable tray.

4. The cable pulling system according to claim 1, wherein the central portion of each said bracket comprises a female end defining an elongated track and a male end having an elongated blade slidable in the track, the female end having an elongated slot defined therein and the male end having spaced apart apertures defined therein alignable with the elongated slot, said eyelet bolts being extendable through the elongated slot and one of the apertures in the male end in order to adjust the length of said brackets to the width of the cable tray when said eyelet bolts are fastened to the central portion of said brackets.

5. The cable pulling system according to claim 1, wherein the jet loop is made from paracord.

6. A cable pulling system for pulling cable, comprising:
    a cable tray having a wire frame defining a bottom and opposing sides extending from the bottom, the opposing sides defining a width of the cable tray;
    a plurality of elongate brackets, each of the brackets having downward extending portions at opposite ends adapted for physically coupling the bracket to the cable tray; and
    a jet loop supported by the plurality of brackets, the jet loop being rotatable and adapted for having the cable attached thereto, the cable being pulled through the tray by rotation of the jet loop.

7. The cable pulling system according to claim 6, further comprising an eyelet bolt attached to each of the brackets, the jet loop passing through the eyes of the eyelet bolts.

8. The cable pulling system according to claim 7, wherein each said bracket comprises a central portion having a length dimensioned and configured for extending across an open top of the cable tray, said eyelet bolts being fastened to the central portion of each said bracket so that the eyes of the eyelet bolts extend down into the tray, whereby said jet loop is suspended from said brackets.

9. The cable pulling system according to claim 8, further comprising:
    a plurality of clamp plates corresponding in number to the downward extending portions of said brackets, each of the downward extending portions having one of the clamp plates corresponding therewith, the clamp plates and the downward extending portions of said brackets having opposing faces having complementary indentations formed therein for receiving the wires forming sides of the cable tray therein; and
    a plurality of fasteners clamping the clamp plates and the downward extending portion of said brackets together on opposite sides of the cable tray.

10. The cable pulling system according to claim 9, further comprising:
    a horizontal roller extending between the downward extending portions of one of said brackets, the roller having a hollow central shaft; and
    a bolt extending through the hollow shaft and through opposing pairs of said clamp plates and the downward extending portion of said brackets, the bolt being selectively fastened thereto, the horizontal roller easing transition of the cable through elevation changes in the cable tray.

11. The cable pulling system according to claim 8, wherein the central portion of said bracket has a plurality of spaced apart apertures defined therein adapted for receiving said eyebolts, whereby said jet loop may be selectively positioned across the width of the cable tray.

12. The cable pulling system according to claim 2, further comprising:
    a vertical roller having a hollow central shaft;
    a roller plate placed under the cable tray; and
    a bolt extending through the roller plate, the hollow shaft, and one of the apertures in the central portion of one of said brackets, the bolt being selectively fastened thereto, the vertical roller easing transition of the cable through curves in the cable tray.

13. The cable pulling system according to claim 8, wherein the central portion of each said bracket comprises a female end defining an elongated track and a male end having an elongated blade slidable in the track, the female end having an elongated slot defined therein and the male end having spaced apart apertures defined therein alignable with the elongated slot, said eyelet bolts being extendable through the elongated slot and one of the apertures in the male end in order to adjust the length of said brackets to the width of the cable tray when said eyelet bolts are fastened to the central portion of said brackets.

14. The cable pulling system according to claim 6, wherein the jet loop is made from paracord.

15. A cable pulling system for pulling cable through a cable tray, comprising:
- a plurality of elongate brackets, each of the brackets having downward extending portions at opposite ends adapted for physically coupling the bracket to the cable tray, wherein each of the brackets comprises a central portion having a length dimensioned and configured for extending across an open top of the cable tray, further wherein the central portion of each of the brackets has a plurality of spaced apart apertures defined therein;
- a jet loop supported by the plurality of brackets, the jet loop being rotatable and adapted for having the cable attached thereto, the cable being pulled through the tray by rotation of the jet loop;
- an eyelet bolt attached to each of the brackets, the jet loop passing through the eyes of the eyelet bolts, wherein the eyelet bolts are fastened to the central portion of each of the brackets so that the eyes of the eyelet bolts extend down into the tray, whereby the jet loop is suspended from the brackets and is selectively positioned across the width of the cable tray.

* * * * *